Patented June 26, 1945

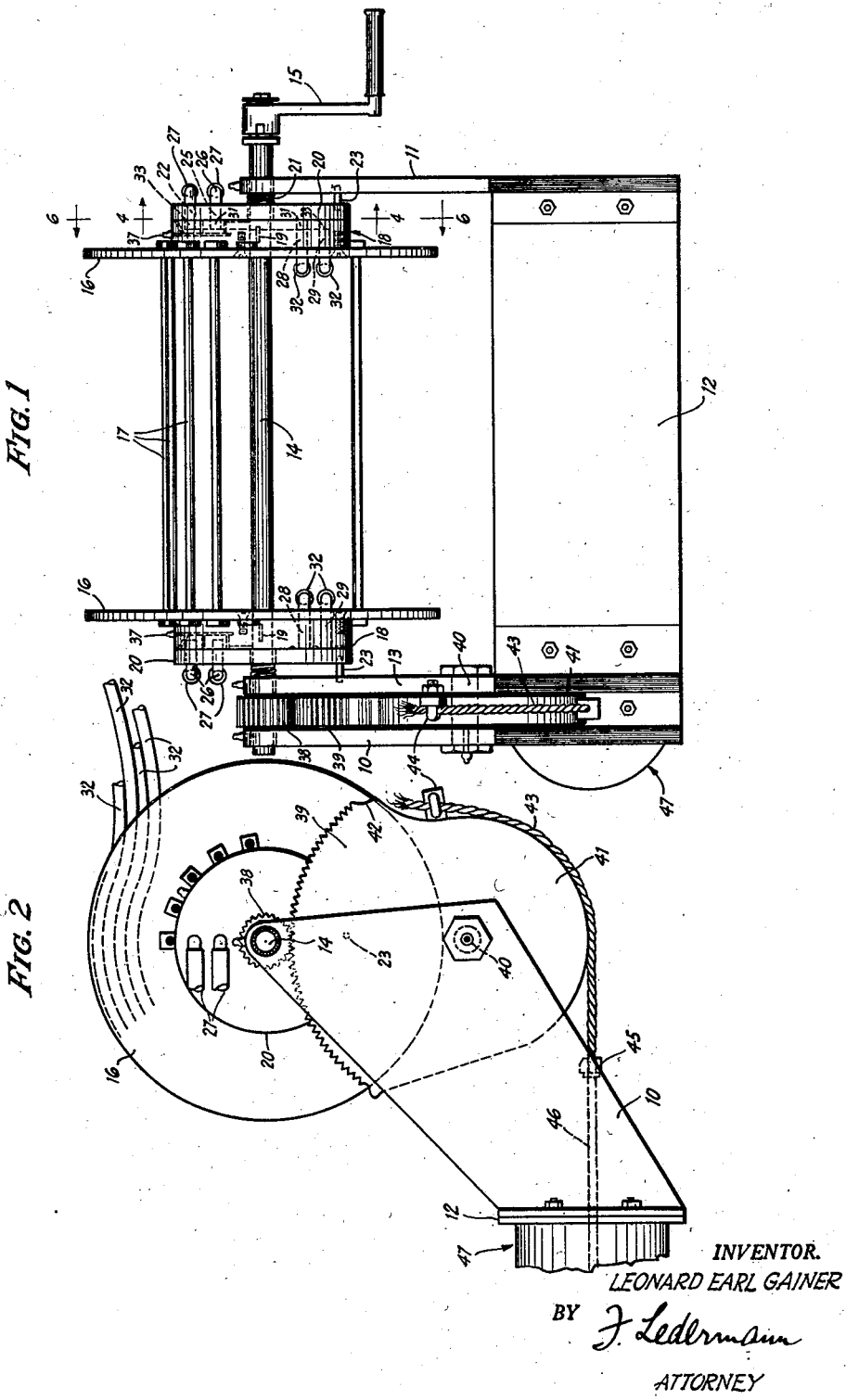

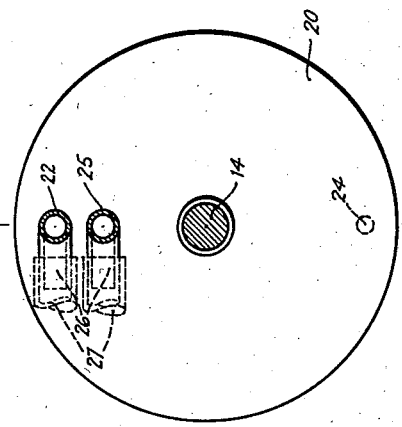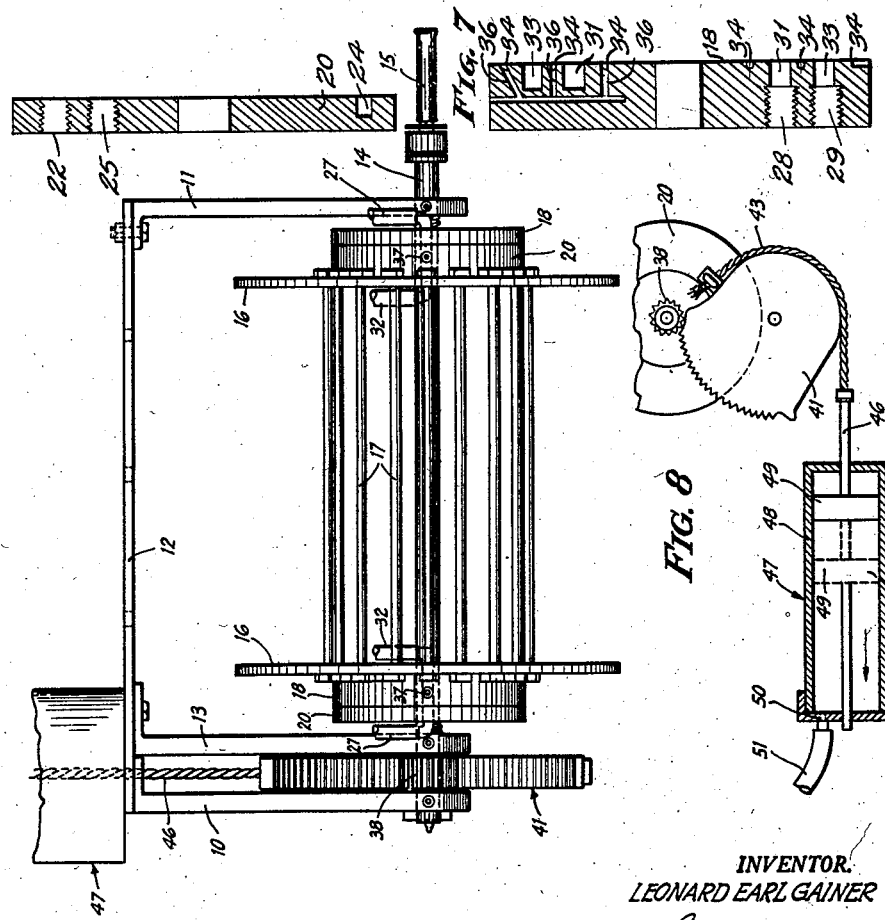

2,378,997

UNITED STATES PATENT OFFICE 2,378,997

WINDING REEL

Leonard Earl Gainer, Lebanon, Oreg.

Application December 14, 1943, Serial No. 514,199

2 Claims. (Cl. 242—77)

This invention relates to reels, and more particularly to reels on which hoses or cables are wound in a position intermediate between an actuating source and a receiving source, for power, wherein the distance between the said two sources is subject to constant or intermittent variation, so that the reel should be provided with means for taking up the slack which develops as a consequence of the said variation in distance. A particular adaptation of the invention, which is illustrated in the drawings, is in connection with logging trucks and trailers, whose brakes are operated through hoses which ordinarily are wound around the coupling pole and form the only connection from the truck (the source) to the trailer brakes (the receiver) for the air, vacuum, or electrical power for operating the trailer brakes.

It has been found in practice that at times a greater amount of slack is required than can be allowed without causing the hose to drag on the ground, and the frequent resultant breaking of the hose lines has caused fatal accidents.

It is therefore the main object of this invention to provide a reel capable of automatically taking up the excess of slack in the hose or hoses, and further to provide means for manual adjustment of the reel prior to automatic operation thereof to bring the slack of the hose within the range through which the reel is capable of automatically taking up the slack.

The above and other objects will become apparent in the following description, wherein characters of the reference refer to like-numbered parts on the accompanying drawings. It is to be noted that the drawings are intended for the purpose of illustration only, and that it is neither intended nor desired to limit the invention necessarily to the exact details of construction shown, excepting insofar as they may be essential to the invention.

Referring briefly to the drawings,

Fig. 1 is a front elevational view of the device and the supporting frame therefor.

Fig. 2 is a side elevational view thereof.

Fig. 3 is a plan view thereof.

Fig. 4 is a sectional view taken on the line 4—4 of Fig. 1.

Fig. 5 is a sectional view taken on the line 5—5 of Fig. 4.

Fig. 6 is a sectional view taken on the line 6—6 of Fig. 1.

Fig. 7 is a sectional view taken on the line 7—7 of Fig. 6.

Fig. 8 is a fragmentary reduced view similar to Fig. 2, with parts broken away and partly in section, showing also in section the booster-like cylinder and piston for the automatic control of the reel.

Referring in detail to the drawings, the numeral 10 indicates one and the numeral 11 the other of a pair of similar brackets secured at their bases to the frame 12 of the truck at the rear thereof. A third bracket 13, similar to the brackets 10 and 11, is similarly secured and is positioned adjacent the member 10. A winding drum shaft 14 passes rotatably through bearing openings in the upper free extremities of the brackets 10, 11, and 13, and is provided at that end adjacent the bracket 11 with a crank handle 15, for manual rotation thereof. The winding drum comprises, in addition to the shaft 14, a pair of spaced drum flanges 16 and a plurality of peripherally spaced and concentrically arranged rods 17 extending through the flanges 16 and secured on the outside surfaces thereof, to form a substantially cylindrical winding drum surface. Obviously, any other form of cylindrical surface may be provided.

Screwed against the outer surface of each flange 16 is a disc 18, and these discs 18 are keyed at 19 to the shaft 14. Loosely mounted on the shaft 14, one adjacent each disc 18, are a pair of discs 20 of the same diameter as the discs 18, and the discs 20 are urged into surface contact with the discs 18 by coiled springs 21. Pins 23, anchored in the frame brackets 11 and 13, project into openings 24 in the discs 20 and thereby restrain the latter from rotation with the drum. Radially spaced passages are provided through the discs 20, through which pass tubes 22 and 25 on whose outer ends are formed nipples 26 for the attachment of hoses 27. Similarly, radially spaced passages are provided through the discs 18 and the flanges 16, through which pass tubes 28 and 29 on whose ends adjacent the inner surfaces of the flanges 16 nipples 30 are formed to receive the ends of hoses 32. Concentric with the tubes 28 and 29, respectively, two circular grooves 31 and 33 are cut into the face of each disc 18 which is adjacent the disc 20; these grooves allow unrestricted passage of air between the grooves and tubes 28 and 29. Since, as seen in Fig. 1, the tubes 25 and 22 are also concentric with the grooves 31 and 33, respectively, unrestricted passage of air is had between the hoses 27 and the hoses 30, the passage through each hose being completely insulated from that through the other.

Into that surface of each disc 18 which faces the disc 20, three peripheral grooves 34 are cut. A radial channel 35 is provided through one peripheral wall of the disc 18, and short channels or passages 36 communicate between the channel 35 and the grooves 34. The channel 35 is adapted to have lubricant inserted thereinto, which passes into the grooves 34 and hence onto the flat surfaces between the discs 18 and 20, thereby both lubricating and sealing the discs against leakage.

In the actuation of air brakes on the trailer by means of either pressure or vacuum supplied from the truck, it is necessary to have four hoses, that is, two hoses on each side, pass to the trailer. Thus, since the reel is mounted intermediate the lengths of these hoses, it is necessary to provide not only the four hoses leaving the drum of the reel but also four hoses extending from the power source in the truck to the four stationary nipples, that is, the four hoses 27. Since it is only the reel and its means of taking up slack that are pertinent to this invention, all unnecessary details have been omitted from the drawings.

In order to plug the oil inlet channel 35 of the disc 18, any suitable fitting, such as a Zerk fitting 37, may be applied.

A pinion 38 is rigid on the shaft 14 between the brackets 10 and 13, and lies in mesh with a sector gear 39 which is adapted to rock or pivot about a stub shaft 40. The base of the sector 39, shown at 41, is rounded to simulate a camlike periphery, as seen in Fig. 2. At the right-hand end, Fig. 2, of the sector gear, a deep and wide notch 42 is provided, and a similar notch may also be provided at the left-hand end. The free end of a flexible cable 43 is secured to a lug 44 extending from the sector, substantially as shown, and passes around the rounded peripheral portion of the sector, the other end of the cable being secured by any suitable coupling 45 to the end of a rod 46 which passes through openings in the bracket base and the support frame 12, into a booster 47.

In Fig. 8 is shown a form which the booster might take, although the only essentials required thereof are that it function in the desired manner, as will be set forth. As shown in Fig. 8, the booster comprises a cylinder having axial openings through both ends, through which the rod 46 passes. Intermediate the length of this rod a piston 49 is rigid thereon. An air inlet 50 through the far end of the cylinder is provided with a nipple having a hose 51 thereon leading to the power source on the truck.

In describing the operation of the device, it will be assumed that it is being used in a vacuum system. It is apparent from Fig. 2 that if the crank 15 is worked to turn the drum in a clockwise direction, after a few turns of the crank the sector will have been rocked to the left into the position shown in Fig. 8, with the pinion 38 lying in the notch 42, and further rotation of the drum will simply cause the pinion to turn freely within that notch without further action upon the sector. The cranking herein just discussed is of course assumed to occur with no vacuum applied in the hose 51.

The operation may now be more fully set forth. After the trailer has been hitched to the truck, with the free ends of the four hoses 32 secured to their respective nipples, not shown, on the trailer, and with the sector in its idle position shown in Fig. 8, with atmospheric pressure in the hose 51, the operator adjusts the length of hose 32 hanging from the drum to the trailer to the length desired, which might be such, for example, that the slack is insufficient to bring any part of the hose to or close to the ground. Then power, or vacuum, is applied to the hose 51, causing the piston 49 to be sucked, or moved, to the left (Fig. 8) to, say, the position shown therein in broken lines. In so shifting, the piston carries the rod 46 through the same distance and rocks the sector through an arc into the position shown in Fig. 2. As the vacuum applied in the hose 51 is constant, it is apparent that a constant cushioned pull is provided on the rocker tending always to rock the sector in a clockwise direction, or, through the pinion 38, to wind the hoses 32 on the drum. Thus excess slack is always taken up the instant it develops. As illustrated, during the full distance traveled by the rod 46 the shaft 14 makes approximately two turns, owing to the pinion 38. On the bare drum, when the hoses 32 have been extended to their full length, the distance of two turns is equivalent to a length of approximately forty inches, and as the hose fills the drum the circumference becomes greater until when filled there are about seventy-two inches of hose involved in two turns of the drum.

It is this amount of hose length, varying between a minimum of forty inches and a maximum of seventy-two inches, which is thus subject to automatically being taken up by the booster operating through the sector. Hence, as the slack is thus constantly and automatically being taken up as it forms, there is no danger that any part of the hose or hoses may drag on or reach the ground, wherefor the safety offered by this device is apparent.

The device set forth is obviously capable of application to an electrical system wherein it is desirable to automatically take up slack in cables strung from one point to another when the distance between the points of suspension is subject to variation, and the same applies of course also to any type of cables whether they are electrical conductors or not.

Obviously, modifications in form and structure may be made without departing from the spirit and scope of the invention.

I claim:

1. In combination with a reel having a pinion rigid on the shaft thereof, means normally urging said pinion to rotate in a reel-winding direction comprising a sector gear in mesh with said pinion, said sector gear having a rounded base, a flexible cable having one end secured to the edge of said sector near the toothed portion thereof, said cable passing around said rounded base, and means normally pulling the other end of said cable in a direction tangential to said rounded base.

2. The combination set forth in claim 1, said pulling means comprising a rod slidably mounted adjacent but spaced from and tangential to said rounded base, said rod having means normally urging the same axially away from said sector, said other end of said cable being secured to said rod.

LEONARD EARL GAINER.